United States Patent [19]

Jozwiak, Jr. et al.

[11] 4,113,598

[45] Sep. 12, 1978

[54] METHOD FOR ELECTRODEPOSITION

[75] Inventors: Edward L. Jozwiak, Jr., Gibsonia; Suryya K. Das, Pittsburgh, both of Pa.

[73] Assignee: PPG Industries, Inc., Pittsburgh, Pa.

[21] Appl. No.: 804,410

[22] Filed: Jun. 7, 1977

Related U.S. Application Data

[62] Division of Ser. No. 599,746, Jul. 28, 1975.

[51] Int. Cl.$^2$ ............................................. C25D 13/06
[52] U.S. Cl. ................................................. 204/181 R
[58] Field of Search .................................... 204/181 R

[56] References Cited

U.S. PATENT DOCUMENTS

| | | | |
|---|---|---|---|
| 3,689,446 | 12/1969 | Furuya et al. | 204/181 R |
| 3,880,793 | 4/1975 | Nakayama | 260/29.6 RW |

*Primary Examiner*—Howard S. Williams
*Attorney, Agent, or Firm*—William J. Uhl

[57] ABSTRACT

A method of preparing resinous vehicles in aqueous medium by addition polymerizing a material having $CH_2=C<$ moieties with a partially neutralized reaction product of an unsaturated carboxylic acid or anhydride and polybutadiene is disclosed. The resinous vehicles are prepared in a manner such that they are useful for electrodeposition.

7 Claims, No Drawings

METHOD FOR ELECTRODEPOSITION

This is a division, of application Ser. No. 599,746, filed July 28, 1975.

BACKGROUND OF THE INVENTION

Field of the Invention

The present invention relates to electrodeposition. In another aspect, the invention relates to electrodeposition employing polymers prepared by a new method in aqueous medium. More particularly, this invention relates to the polymerization of materials having $CH_2=C<$ moieties in the presence of a salt of an adduct of an unsaturated carboxylic acid or anhydride and polybutadiene.

Brief Description of the Prior Art

It is well known that adducts formed from relatively low molecular weight polybutadienes and maleic anhydride are capable of forming coatings that firmly adhere to metal. The adducts can be made water soluble by neutralization with an amine and used as vehicles for water-based coatings in applications such as electrodeposition. See, for example, U.S. Pat. No. 3,511,816 to Dickakian. Unfortunately, such materials are not particularly good for electrodeposition. As aqueous dispersions, they have poor throwpower; do not electrodeposit uniform coatings and the deposited coatings do not have particularly good corrosion resistance.

Besides the above prior art, U.S. Pat. No. 3,258,437 discloses polymers of butadiene prepared in the presence of aqueous medium containing the salt of an adduct of a drying oil and an unsaturated dicarboxylic acid or anhydride such as maleic anhydride. These polymers are prepared in the presence of a water-soluble salt-forming free radical polymerization catalyst; and, although they are excellent resinous vehicles for many coating applications such as dip or spray coating, they are unfortunately not suitable for use in electrodeposition. The salt-forming catalyst affects the conductivity of the bath, causing the polymers to coat out at high voltages which destroys film continuity.

The present invention provides polymers which are of relatively low viscosity and which form smooth continuous films on electrocoating.

SUMMARY OF THE INVENTION

The present invention provides a resinous vehicle prepared by addition polymerizing a material having $CH_2=C<$ moieties such as butadiene; styrene, substituted styrenes such as alpha-methyl styrene and vinyl toluene; lower alkyl ($C_1$ to $C_4$) esters of acrylic and methacrylic acid in the presence of an oil-soluble free radical catalyst with a partially neutralized reaction product of an unsaturated carboxylic acid or anhydride and polybutadiene.

The resinous vehicles of the present invention have high throwpower, good corrosion resistance over both pretreated and untreated steel, and amazing bath stability. That is, the resin can be employed in an electrodeposition bath day after day without decomposing. Besides these advantages, the resin employs water as substantially the only solvent. Also, the resins of the invention lose little solids on baking. Less than about 7 percent by weight solids are lost on baking, whereas losses as high as 25 percent are common with many electrocoating vehicles.

Besides resinous products and their method of preparation, the invention also provides for aqueous dispersions of the resinous products, for methods of electrocoating employing these aqueous dispersions, and for the resultant coated articles.

DETAILED DESCRIPTION

The material having $CH_2=C<$ moieties can be selected from a variety of ethylenically unsaturated materials, particularly vinyl monomers and diene monomers. Examples of the vinyl monomers which may be used are: monoolefinic and diolefinic hydrocarbons such as styrene, vinyl toluene, cyclopentadiene and the like; halogenated monoolefinic and diolefinic hydrocarbons such as alpha-chlorostyrene; esters of organic and inorganic acids such as vinyl acetate, methyl methacrylate, butyl methacrylate, ethyl acrylate, butyl acrylate, isopropenyl acetate, allyl chloride, allyl cyanide, dibutyl itaconate, ethyl-alpha-chloroacrylate and diethyl maleate; organic nitriles such as acrylonitrile, methacrylonitrile and ethacrylonitrile.

Various dienes which may be used in the practice of the invention include in addition to 1,3-butadiene, which is preferred, isoprene and most of the diunsaturated members of the alkylidene series including both the unsubstituted and substituted conjugated diolefins. The substituted diolefins may be those containing lower alkyl groups or halogen groups directly bonded to the alkylidene chain. Representative examples of these diolefins include chloroprene, 2,3-dimethylbutadiene, myrcene and the like. Also, mixtures of dienes as well as mixtures of dienes and vinyl monomers can be used.

Vinyl comonomers containing cyclic rings such as styrene and vinyl toluene in combination with dienes are preferred because they give compositions of improved throwpower. Usually about 20 to 40 percent by weight vinyl monomer and 60 to 80 percent diene are employed; the percentages by weight being based on total weight of the vinyl monomer and diene. By throwpower is meant the property of the resinous vehicle whereby areas of the electrode being coated at varying distances from the other electrode receive substantially the same density of product. Several methods have been proposed for measuring throwpower, including the Ford Cell Test and the General Motors Cell Test, see, for example, Brewer et al, *Journal of Paint Technology*, 41, No. 535, pages 461–471 (1969); and Gilchrist et al, *American Chemical Society, Div. of Organic Coatings and Plastics Chemistry, Preprint Book*, 31, No. 1, pages 346–356, Los Angeles Meeting, March-April 1971.

The polybutadienes used in the practice of the invention are well known in the art as exemplified by U.S. Pat. No. 3,789,046 to Heidel. By the term "polybutadiene" is meant a homopolymer of a conjugated diolefin containing from 4 to 6 carbon atoms such as 1,3-butadiene, isoprene, piperylene or mixtures thereof. Homopolymers and copolymers of 1,3-butadiene (butadiene) are preferred. Any polymer or copolymer of butadiene which is a liquid at room temperature can be employed as starting polymer for the reaction of the process of the present invention, for example, polybutadienes having a viscosity of from 100 to 50,000 centipoises at 20° C. and preferably from about 200 to 5,000 centipoises at 20° C. Such polymers preferably have a molecular weight (weight average) of about 400 to 10,000, more preferably, from about 700 to 5,000. Especially preferred are the liquid polymers having a viscosity of less than 5,000 centipoises at 20° C. and particularly those having a viscosity of less than 1,000 centipoises at 20° C.

The preferred starting polymers are liquid polybutadiene polymers or copolymers produced in the presence of an organo metal/nickel catalyst system. These polymers generally contain butadiene polymer units of which at least 50 percent, preferably at least 60 percent, for example, 50–90 percent, have the cis-1,4- structure, substantially all of the remainder, for example, 10–50 percent, having the trans-1,4- structure, with less than 3 percent, usually less than 1 percent, having 1,2-vinyl structure. Polybutadienes can have incorporated therein up to 30 percent of another diolefin, for example, isoprene or 2,3-dimethyl-1,3-butadiene or both, and/or an olefin, for example, 1 or more of styrene, propene, and butene-1. Especially preferred as starting materials are liquid polybutadiene homopolymers obtained in published application DAS No. 1,186,631.

The unsaturated carboxylic acid utilized in forming the adduct can be an alpha, beta-ethylenically unsaturated dicarboxylic acid or its anhydride such as maleic acid, fumaric acid, itaconic acid, maleic anhydride and itaconic anhydride. Mixtures of the same or different acids and anhydrides may also be utilized. Ordinarily, the acid and anhydride employed should contain from about 4 to 12 carbon atoms, although longer chain compounds can also be employed if desired.

In preparing the adduct of the carboxylic acid or anhydride and polybutadiene, about 5 to 25 percent by weight of the unsaturated acid or anhydride should be reacted with from about 95 to 75 percent by weight of the polybutadiene. If less than 5 percent by weight of the unsaturated acid or anhydride is employed, the adducts will only be partially water soluble unless water-soluble organic solvents are employed to give water solubility. Even when so formulated, however, such adducts will not have good bath stability and may not give films which possess the desired degree of hardness required in protective coatings for metallic surfaces, and may not have adequate corrosion resistance. If more than 25 percent of acid or anhydride is used, the resultant films may be seriously deficient in water resistance.

The reaction between the acid or acid anhydride and the polybutadiene takes place readily without the use of catalyst, although a copper compound may be used to control viscosity. Reaction temperatures within the range of 190° to about 220° C. or higher are typical.

The adduct of the polybutadiene with the acid or acid anhydride component can be modified by partially esterifying the carboxylic acid groups. For example, esterification can take place with alcohol or with a polyol. Partial esterification modifies film properties and in certain instances has been found to increase throwpower.

The adduct obtained from the above reactants is not dispersible in water. To make the material water dispersible, the acidity of the adduct has to be at least 30 percent neutralized with a water-soluble inorganic base such as sodium or potassium hydroxide or an organic base such as ammonia or water-soluble amine or quaternary ammonium hydroxide. Among the amines which may be utilized are water-soluble primary, secondary and tertiary amines such as methylamine, ethylamine, propylamine, dimethylamine, diethylamine, dipropylamine, trimethylamine, triethylamine, triporpylamine, tributylamine, monoethanolamine, monobutanolamine, diethanolamine, dibutanolamine, triethanolamine, tributanolamine and the like. Examples of the quaternary ammonium hydroxides which may be employed include trimethyl benzyl ammonium hydroxide and trimethyl lauryl ammonium hydroxide.

Preferably, the pH of the neutralized and solubilized adduct should be maintained in the range of 8.0 to 9.2. If the pH is substantially lower than 8.0, a physical separation of the dispersion takes place.

The resinous compositions of the instant invention are prepared by simply admixing the diene or the diene plus unsaturated monomer in water with an oil-soluble free radical-type catalyst, and the amine or ammonia solubilized salt of the adduct of the polybutadiene and the unsaturated carboxylic acid or anhydride. The reaction mass is then heated for a period of about 2 to 20 hours.

In order to obtain a product suitable for use in electrodeposition, it is desirable that the salt of the adduct of the polybutadiene and unsaturated carboxylic acid or anhydride be present in amounts of at least 5 and preferably 20 to 75 percent by weight of the total reactants.

As has been mentioned above, polymerization of the diene with the salt of the adduct of polybutadiene and a carboxylic acid or anhydride is conducted in the presence of an oil-soluble free radical-type catalyst. These types of catalysts have been found to give products having the desired viscosity needed for electrodeposition.

Examples of suitable oil-soluble catalysts include azobisisobutyronitrile, cumene hydroperoxide, diisopropylbenzene hydroperoxide, diazothioether, para-methoxyphenyl diazothio-(2-naphthyl) ether and para-chlorobenzyl peroxide. Azobisisobutyronitrile is the preferred free radical initiator because it brings about an approximately 100 percent conversion of the diene into polymer product. Other free radical polymerization catalysts such as those mentioned above have not been found to give as high a conversion.

Besides the free radical catalyst, a chain terminator such as tertiary-dodecyl mercaptan, 2-mercaptoethanol, isooctyl mercaptopropionate, para-octyl mercaptan, 3-mercaptopropionic acid is preferably incorporated into the polymer charge. Chain terminators provide the necessary control over molecular weight to give products having the required viscosity for electrodeposition. Tertiary-dodecyl mercaptan is preferred because it results in high conversion of diene into polymer product. Other chain terminators such as those mentioned above give lower conversions.

For electrodeposition, the above-described resinous products are dispersed in water to about 1 to 30 percent by weight resin solids aqueous dispersions. The term "aqueous dispersion" as used within the context of the present invention is intended to cover two-phase, translucent, aqueous-resin systems, especially those in which the aqueous phase forms the continuous phase, and is also intended to cover homogeneous aqueous solutions which appear optically clear. The aqueous dispersions of the present invention have dispersed phases which have average particle size diameters of about 0.1 to 5 microns. The dispersed phase may be spherical or elongated in shape or actually invisible by microscopic investigation. The dispersions are generally only stable if the particle size does not exceed 5 microns.

The products can be employed as such to electrodeposit clear films, but ordinarily they are used as a vehicle along with a pigment composition. The pigment composition used may be of any conventional type, comprising, for example, iron oxides, lead oxides, strontium chromate, carbon black, titanium dioxide, talc, barium sulfate and the like, as well as combinations of these and similar pigments. Color pigments such as cadmium yellow, cadmium red, phthalocyanine blue, chromic yellow, toluidine red, hydrated iron oxide and the like may also be included. Dispersing or surface active agents which should be of nonionic or anionic type or a combination of these types can also be employed.

Usually, the pigment and surface active agent, if used, are ground together in a portion of the vehicle to make a paste, and this is blended with the major portion of the vehicle to produce the coating composition. There may also be included in the coating compositions additives such as anti-oxidants, wetting agents, dryers, anti-foaming agents, suspending agents and the like. It is often desirable to include small amounts of water-miscible organic solvents, which may be added to the resinous vehicle to aid in handling and processing. 4-Methoxy-4-methyl-pentanone-2 is a preferred solvent of this type, but others, such as dioxane and glycol ethers, can also be used.

It has been found that in most instances desirable coatings are obtained using pigmented compositions containing weight ratios of pigment to vehicle of not higher than about 1.5 to 1 and preferably not higher than about 1 to 1. If the composition has too high a pigment-to-vehicle ratio, the electrodeposited film may exhibit poor flow characteristics.

In formulating the water-dispersed compositions, ordinary tap water may be employed. However, such water may contain relatively high levels of cations, which, while not ordinarily rendering the process inoperative, may result in variations in the properties of the bath when used for electrodeposition. In such cases, it is often desirable to utilize deionized water from which the free ions have been removed, as by passage through an ion exchange resin.

The compositions such as described above are applied by placing the aqueous bath containing the composition in contact with an electrically conductive anode and an electrically conductive cathode and passing an electric current between the electrodes. The electrodes may be of any electrically conductive material, usually metal such as iron, steel, aluminum, galvanized steel, phosphatized steel, zinc, copper, or other metal. Other electrically conductive materials or non-conductive materials such as glass, plastics, etc. having a surface made conductive by application of a conductive coating or a layer, can also be coated in accordance with the invention. Upon passage of electric current between the anode and the cathode, while in contact with the bath containing the coating composition, an adherent film of the coating composition is deposited on the anode.

Generally speaking, the conditions under which the electrodeposition process is carried out are those conventionally used in the electrodeposition methods employed heretofore. The applied voltage may be varied greatly and can be very low, for example, 1 volt, or very high, for example, several thousand volts or even higher. Particularly advantageous of the products herein is that they permit the use of higher voltage without the problems usually encountered; thus, they are often electrodeposited from about 200 to about 500 volts.

Electrodeposition produces an adherent film which is very high in solids content, often 80 to 90 percent or even higher, which provides the important advantage that the film will not readily run or wash. Although the articles so coated can be used, if desired, without additional baking or other drying procedures, additional baking or drying of the film is usually accomplished inasmuch as there is little or no solvent to be evaporated from the film. Ordinarily, the coated articles are baked at a temperature of about 125° C. to about 200° C. for about 10 minutes to 30 minutes.

The invention will be described further in conjunction with several examples showing the method and practice of the invention. These examples, however, are not to be construed as limiting the invention to their details. All parts and percentages by weight are based upon nonvolatile solids content unless otherwise indicated.

EXAMPLE I

A maleinized polybutadiene was prepared by charging 220 parts by weight of polybutadiene, 0.75 parts by weight of copper naphthanate, 0.08 parts of acetyl acetone and 8.4 parts by weight of xylene to a reaction vessel under a nitrogen blanket. The polybutadiene had a molecular weight of about 900 and was sold commercially by Lithium Corporation of America as LITHENE QL. The mixture was heated to 99° C. and charged with 33 parts of maleic anhydride. The reaction mixture was heated to 193° C. and held at this temperature until a Gardner-Holdt viscosity of F was obtained (15 parts resin diluted with 5 parts xylene). The mixture was then sparged for ½ hour with nitrogen, cooled to 99° C. and charged with 27.4 parts by weight of diacetone alcohol. The mixture was cooled to 71° C. and charged with 19.3 parts of methanol and 0.22 parts by weight of benzyl dimethylamine catalyst. The temperature of the reaction mixture was maintained at 71° C. for one hour, cooled to 66° C. and then charged with 2.8 parts by weight of cresylic acid (anti-oxidant). The resultant product had a Gardner-Holdt viscosity of Y and a Brookfield viscosity of 17,500, spindle No. 4, 12 rpm. 23° C.

EXAMPLE II

The following was charged to a closed reaction vessel capable of maintaining pressure:

| Charge | Parts by Weight |
|---|---|
| maleinized polybutadiene of Example I | 270.0 |
| deionized water | 286.5 |
| azobisisobutyronitrile | 4.9 |
| tertiary-dodecyl mercaptan | 4.9 |
| styrene | 36.5 |
| surfactant mix[1] | 1.2 |
| 1,3-butadiene | 85.0 |

[1]The surfactant mix comprised 5.8 parts by weight of a fluorocarbon commercially available from 3M Corporation as FC-430, 283.0 parts by weight of deionized water and 1.1 parts by weight of triethylamine.

The charged vessel was closed, heated to 70° C. and held for about 16 hours with agitation to complete reaction.

EXAMPLE III

A pigment grind ground to a 7.5 Hegman was prepared from the following charge:

| Charge | Parts by Weight |
|---|---|
| grinding vehicle[1] | 500 |
| clay | 210 |

| | |
|---|---|
| lead silicate | 70 |
| strontium chromate | 35 |
| brown iron oxide | 385 |

[1]The grinding vehicle was an epoxy-fatty acid ester prepared by charging the following to a glass reactor:

| Charge | Parts by Weight |
|---|---|
| EPON 828[A] | 1730 |
| PAMOLYN 200[B] | 5500 |
| xylene | 172 |
| benzyl dimethylamine | 6 |
| stannous octoate | 6 |

[A]Condensation product of epichlorohydrin and Bisphenol A having an epoxide equivalent of about 185–192, commercially available from Shell Chemical Company.
[B]A fatty acid composition containing 17 percent by weight oleic acid, 70 percent by weight linoleic acid and 11 percent by weight conjugated linoleic acid, which is commercially available from Hercules Inc.

The charge was heated to about 195° C. and held for about one hour and then raised to about 250° C. and maintained at this temperature until an acid value of 5.92 was obtained. The reaction mixture was sparged with nitrogen for 15 minutes and then cooled to room temperature, at which time 1340 parts by weight of maleic anhydride was added to the reactor. The reaction mixture was then heated to about 225° C. and held for two hours and then sparged with nitrogen for approximately 15 minutes. The reaction mixture was cooled to room temperature. The epoxy-fatty acid ester had a Gardner-Holdt viscosity at 75 percent solids in xylene of Y$^-$. The epoxy-fatty acid ester at 100 percent solids was dispersed by combining with a solution of water and diethylamine (18.4 percent by weight based on weight of epoxy-fatty acid ester) to form a 39.5 percent by weight resin solids solution.

The pigment grind was thinned with 200 parts by weight of deionized water to form the paste.

An electrodeposition bath was prepared by dispersing 1250 parts by weight of the copolymer of Example II and 156.5 parts by weight of the pigment paste prepared as described above in 1744.5 parts by weight of deionized water; 5.7 parts by weight of 4-methoxy-4-methyl pentanone and 0.5 percent by weight (based on weight of copolymer) of 2,6-ditertiary butyl-4-methyl phenol (anti-oxidant) was added to complete the dispersion. The bath had a solids content of approximately 20 percent and a pH of 8.5. Both untreated and zinc phosphated steel panels were electrocoated with the bath, the bath temperature being 23° C. at 225–275 volts to produce smooth dull films of about 1 mil thickness.

EXAMPLE IV

A maleinized polybutadiene was prepared as generally described in Example I above from the following charge:

| Charge | Parts by Weight |
|---|---|
| polybutadiene[1] | 1350 |
| copper naphthanate[2] | 3.0 |
| xylene | 45.0 |
| maleic anhydride | 150.0 |
| cyclohexanol | 75.0 |
| benzyl dimethylamine | 1.0 |
| butylated hydroxy toluene | 7.5 |

[1]Polybutadiene had a molecular weight of 1000–1500 and was sold commercially by Chemische Werke Huls as HULS 110.
[2]Copper naphthanate was an 8 percent by weight solution in mineral spirits.

The procedure for making the product was generally described in Example I. The polybutadiene, copper naphthanate, xylene and maleic anhydride were charged to a reaction vessel under a nitrogen blanket and heated to 195° C. and held for two hours. The mixture was then sparged for ½ hour with nitrogen, cooled to 140° C. and charged with cyclohexanol and benzyl dimethylamine. The mixture was held for two hours at 140° C. cooled to 120° C. and the butylated hydroxy toluene added. The product had a Brookfield viscosity of 17,500 centipoises at 23° C., spindle No. 4, 12 rpm's.

EXAMPLE V

A maleinized polybutadiene similar to Example IV above was prepared from the following charge:

| Charge | Parts by Weight |
|---|---|
| polybutadiene (see Example IV) | 1181.2 |
| copper naphthanate (see Example IV) | 4.0 |
| xylene | 45.0 |
| maleic anhydride | 284.6 |
| allyl alcohol | 84.0 |
| benzyl dimethylamine | 1.0 |
| dodecyl alcohol | 146.0 |
| ethanol | 38.0 |
| butylated hydroxy toluene | 7.5 |
| diacetone alcohol | 147.0 |

The product was prepared by charging the polybutadiene, copper naphthanate and xylene to a reaction vessel under a nitrogen blanket and heating to 100° C., at which point the maleic anhydride was charged. The mixture was heated to 195° C. and held for two hours. The mixture was sparged with nitrogen for ½ hour and cooled to 90° C. and the allyl alcohol and benzyl dimethylamine charged. The mixture was then heated to 140° C. and held for two hours at which point the dodecyl alcohol was added. The mixture was held at 140° C. for an additional two hours, cooled to 90° C. and the ethyl alcohol charged. The mixture was held for one hour at 90° C., then charged with the butylated hydroxy toluene and the diacetone alcohol.

EXAMPLE VI

A resinous vehicle suitable for electrodeposition comprising the addition polymerization product of butyl methacrylate with the partially reacted product of Example I was prepared from the following charge:

| Ingredient | Parts by Weight |
|---|---|
| maleinized polybutadiene of Example I | 920.5 |
| deionized water | 300.7 |
| azobisisobutyronitrile | 4.9 |
| butyl methacrylate | 121.5 |
| surfactant mix of Example II | 2.4 |

The above charge was added to a reaction vessel. The charge was heated to 85° C. for about 6½ hours to complete reaction and form the desired product. The product contained 30.1 percent solids.

EXAMPLE VII

A resinous vehicle suitable for electrodeposition comprising the addition polymerization reaction product of butyl acrylate with the partially neutralized reaction product of Example I was prepared as follows from the following charge:

| Ingredient | Parts by Weight |
|---|---|
| maleinized polybutadiene of Example I | 1400.0 |
| deionized water | 409.0 |

-continued

| Ingredient | Parts by Weight |
| --- | --- |
| azobisisobutyronitrile | 7.2 |
| butyl acrylate | 180.0 |
| surfactant mix of Example II | 3.6 |

The charge was added to a reaction vessel and heated to 85° C. for eight hours to form the desired reaction product having 29.8 percent total solids.

EXAMPLE VIII

A resinous vehicle suitable for electrodeposition comprising the addition polymerization reaction product of alpha-methyl styrene with the partially neutralized reaction product of Example I was prepared from the following charge:

| Ingredient | Parts by Weight |
| --- | --- |
| maleinized polybutadiene of Example I | 1233.5 |
| cumene hydroperoxide | 2.4 |
| alpha-methyl styrene | 120.6 |
| surfactant mix of Example II | 2.4 |

The charge was added to a reaction vessel and heated to 82° C. for about 25 minutes. At this point, an additional 1.2 parts by weight of cumene hydroperoxide were added, the reaction heated at 86° C. for an additional hour, followed by the addition of another 1.2 parts of cumene hydroperoxide. The reaction temperature was maintained at 85°–86° C. for about another hour to obtain a reaction product having 23.2 percent solids. About 26 percent of the alpha-methyl styrene is polymerized with the maleinized polybutadiene.

EXAMPLE IX

A resinous vehicle suitable for electrodeposition comprising the addition polymerizate of vinyl toluene with the partially neutralized reaction product of Example I was prepared from the following charge:

| Ingredient | Parts by Weight |
| --- | --- |
| partially neutralized maleinized polybutadiene of Example I[1] | 1206.0 |
| deionized water | 89.8 |
| azobisisobutyronitrile | 1.6 |
| vinyl toluene | 40.2 |
| surfactant mix of Example II | 2.4 |

[1]Maleinized polybutadiene of Example I neutralized by charging 430 parts by weight of it to a mixture of 14.2 parts by weight of ammonia (28 percent) and 760.9 parts by weight of deionized water.

The above ingredients were charged to a reaction vessel and heated to 83° C. for about 9 hours to form the desired reaction product.

EXAMPLE X

A resinous vehicle suitable for electrodeposition comprising the addition polymerizate of vinyl toluene with the partially neutralized reaction product of Example I was prepared from the following charge:

| Ingredient | Parts by Weight |
| --- | --- |
| maleinized polybutadiene of Example I | 1400.0 |
| deionized water | 409.0 |
| azobisisobutyronitrile | 7.2 |
| vinyl toluene | 180.0 |
| surfactant mix of Example II | 3.6 |

The above charge was added to a reaction vessel, heated to 85° C. and held for 9 hours to form the desired reaction product having a total solids content of 20.14 percent.

We claim:
1. A method of coating an electrically conductive surface which comprises passing electric current between an electrically conductive anode and an electrically conductive cathode in contact with a water-dispersed coating composition comprising a resinous vehicle which is the addition polymerization reaction product of:
   (A) a material having $CH_2=C<$ moieties,
   (B) an at least 30 percent neutralized reaction product of:
      (1) an alpha, beta-ethylenically unsaturated dicarboxylic acid or its anhydride containing from 4 to 11 carbon atoms, and
      (2) polybutadiene which is a liquid at room temperature and which has a molecular weight of 700–5000;

said polymeric reaction product having been produced in aqueous medium in the presence of an oil-soluble free radical polymerization catalyst and a chain transfer agent.

2. The method of claim 1 in which the material having $CH_2=C<$ moieties is selected from the class consisting of vinyl monomers and diene monomers and mixtures thereof.

3. The method of claim 2 in which the diene is 1,3-butadiene.

4. The method of claim 1 in which the free radical polymerization catalyst is selected from the class consisting of azobisisobutyronitrile and cumene hydroperoxide.

5. The method of claim 1 in which the chain transfer agent is tertiary-dodecyl mercaptan.

6. The method of claim 1 in which the unsaturated carboxylic acid is maleic acid or anhydride.

7. A coated article comprising an electrically conductive substrate and an adherent film of the resinous vehicle applied by the method of claim 1.

* * * * *